(12) United States Patent
Kim et al.

(10) Patent No.: US 12,277,587 B2
(45) Date of Patent: Apr. 15, 2025

(54) METHOD AND APPARATUS FOR AGREEMENT OF BLOCK IN BLOCKCHAIN NETWORK

(71) Applicant: ELECTRONICS AND TELECOMMUNICATIONS RESEARCH INSTITUTE, Daejeon (KR)

(72) Inventors: Young-Chang Kim, Daejeon (KR); Ki Young Kim, Daejeon (KR); Jintae Oh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 774 days.

(21) Appl. No.: 17/105,761

(22) Filed: Nov. 27, 2020

(65) Prior Publication Data

US 2022/0027970 A1    Jan. 27, 2022

(30) Foreign Application Priority Data

Jul. 27, 2020  (KR) ........................ 10-2020-0093344

(51) Int. Cl.
  *G06Q 30/0601* (2023.01)
  *H04L 9/32* (2006.01)
  *H04L 9/00* (2022.01)

(52) U.S. Cl.
  CPC ....... *G06Q 30/0613* (2013.01); *H04L 9/3236* (2013.01); *H04L 9/3265* (2013.01);
  (Continued)

(58) Field of Classification Search
  CPC ............... H04L 41/0893; H04L 9/3297; H04L 12/1886; H04L 9/0643; G06Q 20/3825
  See application file for complete search history.

(56) References Cited

U.S. PATENT DOCUMENTS 8,706,914 B2 * 4/2014 Duchesneau ......... G06F 9/5072
                                                 709/250
11,967,381 B2 * 4/2024 Chae ...................... G11C 5/147
(Continued)

FOREIGN PATENT DOCUMENTS

KR    10-2019-0054738 A    5/2019
KR    10-2020-0074912 A    6/2020
(Continued)

*Primary Examiner* — Olusegun Goyea
(74) *Attorney, Agent, or Firm* — LRK PATENT LAW FIRM

(57) ABSTRACT

An agreement method of a block in a blockchain network by a chair node includes: receiving, from a plurality of congress nodes in a congress, information on an exceptional situation which occurred during agreement processes of a block; transmitting an empty block agreement start message including information on the exceptional situation and verification data for the exceptional situation to the plurality of congress nodes; generating a candidate empty block which does not include a transaction when receiving a delegate request message from at least two congress nodes among the plurality of congress nodes and transmitting the candidate empty block to committee nodes; and generating a final empty block when the candidate empty block is verified by the committee nodes and transmitting the final empty block to all nodes in the blockchain network is provided.

4 Claims, 11 Drawing Sheets

(52) U.S. Cl.
CPC ............ *G06Q 2220/16* (2013.01); *H04L 9/50* (2022.05); *H04L 2209/56* (2013.01)

(56) References Cited

U.S. PATENT DOCUMENTS

| | | | |
|---|---|---|---|
| 2018/0329783 A1* | 11/2018 | Karame | G06F 11/0709 |
| 2018/0337882 A1* | 11/2018 | Li | G06Q 20/3825 |
| 2019/0147438 A1 | 5/2019 | Micali | |
| 2019/0251007 A1* | 8/2019 | Mac Brough | G06F 11/187 |
| 2019/0327084 A1 | 10/2019 | Oh et al. | |
| 2019/0354518 A1* | 11/2019 | Zochowski | G06F 16/2379 |
| 2019/0379538 A1 | 12/2019 | Oh et al. | |
| 2020/0059369 A1* | 2/2020 | Li | H04L 9/0643 |
| 2020/0162264 A1* | 5/2020 | Zamani | H04L 9/3247 |
| 2020/0396081 A1* | 12/2020 | Ansel | G06F 11/0751 |
| 2020/0403776 A1* | 12/2020 | Oh | H04L 9/3247 |
| 2024/0146419 A1* | 5/2024 | Bae | H04B 10/61 |
| 2024/0296158 A1* | 9/2024 | Nakasaka | G06Q 10/083 |

FOREIGN PATENT DOCUMENTS

| | | | | |
|---|---|---|---|---|
| KR | 10-2020-0083145 A | 7/2020 | | |
| WO | WO-2019080235 A1 * | 5/2019 | ......... | G06F 11/1464 |
| WO | WO-2020133326 A1 * | 7/2020 | ............... | H04L 9/40 |

\* cited by examiner

METHOD AND APPARATUS FOR AGREEMENT OF BLOCK IN BLOCKCHAIN NETWORK

CROSS-REFERENCE TO RELATED APPLICATION

This application claims priority to and the benefit of Korean Patent Application No. 10-2020-0093344 filed in the Korean Intellectual Property Office on Jul. 27, 2020, the entire content of which is incorporated herein by reference.

BACKGROUND OF THE INVENTION

1. Field of the Invention

This disclosure relates to a method and an apparatus for agreement of a block in a blockchain network.

2. Description of Related Art

In the conventional distributed agreement algorithm such as Practical Byzantine Fault Tolerance (PBFT), when a chair node (or primary node) among predetermined 3f+1 (f is the number of Byzantine nodes) congress nodes breaks, a new chair node is elected and the agreement can proceed by the new chair node. The election of the new chair node can follow a view change protocol, and the new chair node can proceed with the agreement so that nodes participating in the blockchain network maintain a consistent view state.

However, in a public blockchain environment, a situation in which the agreement cannot proceed because a quorum 2f+1 required for the agreement is not satisfied due to failures of not only the chair node but also other nodes participating in the agreement or network delay. Further, if the chair node is the Byzantine node, it is difficult to prevent the chair node from modifying and distributing the agreed block for malicious purposes.

SUMMARY OF THE INVENTION

An exemplary embodiment provides an agreement method of a block in a blockchain network by a chair node.

Another exemplary embodiment provides a chair node device for performing a block agreement in a blockchain network.

Yet another exemplary embodiment provides an agreement method of a block in a blockchain network by a congress node.

According to an embodiment of the present invention, an agreement method of a block in a blockchain network by a chair node is provided.

According to an embodiment of the present invention, an agreement method of a block in a blockchain network by a chair node is provided. The method includes receiving, from a plurality of congress nodes in a congress, information on an exceptional situation which occurred during agreement processes of a block; transmitting an empty block agreement start message including information on the exceptional situation and verification data for the exceptional situation to the plurality of congress nodes; generating a candidate empty block which does not include a transaction when receiving a delegate request message from at least two congress nodes among the plurality of congress nodes and transmitting the candidate empty block to committee nodes; and generating a final empty block when the candidate empty block is verified by the committee nodes and transmitting the final empty block to all nodes in the blockchain network.

The receiving, from a plurality of congress nodes in a congress, information on an exceptional situation which occurred during agreement processes of a block may include receiving, from the congress node, information on a first exceptional situation which occurred in a prepare phase of the agreement processes.

The receiving, from a plurality of congress nodes in a congress, information on an exceptional situation which occurred during agreement processes of a block may include receiving, from the congress node, information on a second exceptional situation which occurred in a reply phase of the agreement processes.

The candidate empty block may include information about a next block congress determined in a process in which the exceptional situation occurred.

The committee nodes may include the chair node and 2f nodes of the at least two congress nodes, and f may be an integer greater than or equal to 0.

The generating a final empty block when the candidate empty block is verified by the committee nodes and transmitting the final empty block to all nodes in the blockchain network may include: receiving a commit message including signatures of the committee nodes from the committee nodes after the candidate empty block is verified by the committee nodes; and performing a multi-signature procedure by collecting the signatures of the committee nodes, and generating the final empty block by using the multiple signature.

The method may further include organizing a new congress for an agreement of an empty block after receiving the information on the exceptional situation, wherein the new congress may be a congress of the agreement processes of the block or a congress including other nodes included in the blockchain network.

The method may further include organizing a new congress for an agreement of an empty block based on nodes which participated in a creation of a genesis block of the blockchain network after receiving the information on the exceptional situation.

According to another exemplary embodiment, a chair node device for performing a block agreement in a blockchain network is provided. The chair node includes: a processor, a memory, and a communication unit, wherein the processor executes a program stored in the memory to perform: detecting an exceptional situation which occurred during distributed agreement processes for a block; transmitting an empty block agreement start message including information on the exceptional situation and verification data for the exceptional situation to the plurality of congress nodes through the communication unit; generating a candidate empty block which does not include a transaction when receiving a delegate request message from at least two congress nodes among the plurality of congress nodes and transmitting the candidate empty block to committee nodes through the communication unit; and generating a final empty block when the candidate empty block is verified by the committee nodes and transmitting the final empty block to all nodes in the blockchain network through the communication unit.

When the processor performs the detecting an exceptional situation which occurred during distributed agreement processes for a block, the processor may perform detecting a first exceptional situation which occurred in a delegate request phase of the distributed agreement processes.

When the processor performs the detecting a first exceptional situation which occurred in a delegate request phase of the distributed agreement processes, the processor may perform determining that a number of delegate request messages transmitted to the chair node device is smaller than a number of predetermined committee nodes.

When the processor performs the detecting an exceptional situation which occurred during distributed agreement processes for a block, the processor may perform detecting a second exceptional situation which occurred in a commit phase of the distributed agreement processes.

When the processor performs the detecting a second exceptional situation which occurred in a commit phase of the distributed agreement processes, the processor may perform determining that a number of commit messages transmitted to the chair node device is smaller than a number of predetermined committee nodes.

The candidate empty block may include information about a next block congress determined in a process in which the exceptional situation occurred.

The committee nodes may include the chair node and 2f nodes of the at least two congress nodes, and f may be an integer greater than or equal to 0.

When the processor performs the generating a final empty block when the candidate empty block is verified by the committee nodes and transmitting the final empty block to all nodes in the blockchain network through the communication unit, the processor may perform: receiving a commit message including signatures of the committee nodes from the committee nodes after the candidate empty block is verified by the committee nodes; and performing a multi-signature procedure by collecting the signatures of the committee nodes, and generating the final empty block by using the multiple signature.

The processor may execute the program to further perform organizing a new congress for an agreement of an empty block after receiving the information on the exceptional situation, wherein the new congress may be a congress of the distributed agreement processes of the block or a congress including other nodes included in the blockchain network.

The processor may execute the program to further perform organizing a new congress for an agreement of an empty block based on nodes which participated in a creation of a genesis block of the blockchain network after receiving the information on the exceptional situation.

According to yet another exemplary embodiment, an agreement method of a block in a blockchain network by a congress node is provided. The method includes: transmitting, to a chair node in a congress, information on an exceptional situation which occurred during distributed agreement processes of a block; receiving an empty block agreement start message including information on the exceptional situation and verification data for the exceptional situation from the chair node; transmitting a delegate request message to the chair node and receiving a candidate empty block which does not include a transaction from the chair node; and transmitting a signature of the congress node to the chair node after verifying the candidate empty block and receiving a final empty block from the chair node.

DETAILED DESCRIPTION OF THE EMBODIMENTS

Figure 1:
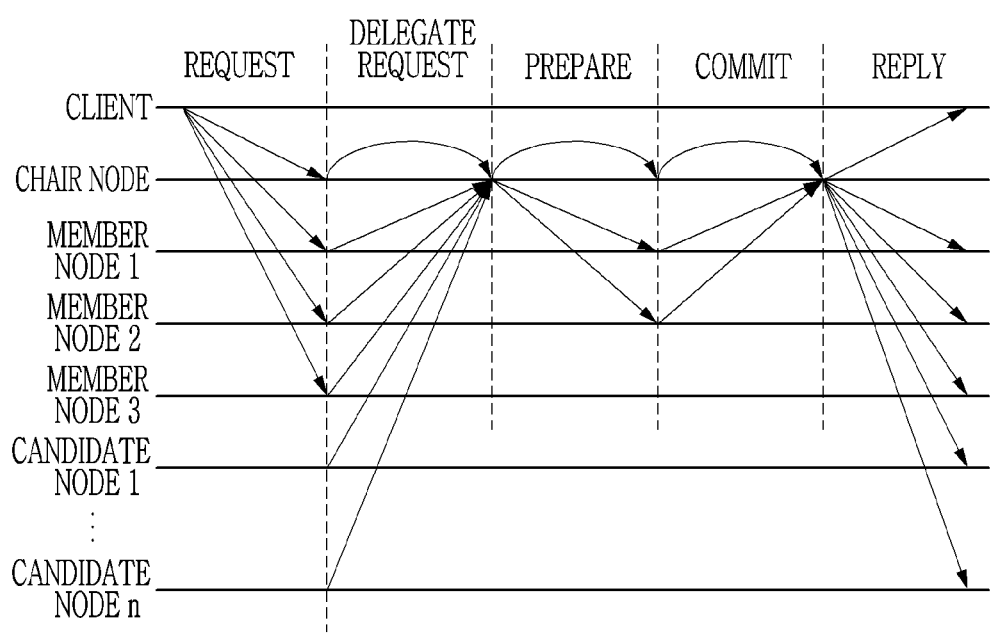
FIG. 1 is a schematic diagram illustrating a distributed agreement method of a blockchain network according to an exemplary embodiment.

In the following detailed description, only certain exemplary embodiments of the present invention have been shown and described in detail with reference to the accompanying drawing, simply by way of illustration. However, the present disclosure may be implemented in various different forms and is not limited to the exemplary embodiments described herein. Further, in order to clearly describe the description in the drawing, parts not related to the description are omitted, and similar reference numerals are attached to similar parts throughout the specification.

In this specification, unless explicitly described to the contrary, the word "comprise", and variations such as "including" or "containing", will be understood to imply the inclusion of stated elements but not the exclusion of any other elements.

In this specification, expressions described in singular can be interpreted as singular or plural unless explicit expressions such as "one" or "single" are used.

In this specification, "and/or" includes all combinations of each and at least one of the mentioned elements.

In this specification, terms including ordinal numbers such as first and second may be used to describe various configurations elements, but the elements are not limited by the terms. The terms may be only used to distinguish one element from another element. For example, a first element may be named a second element without departing from the right range of the present disclosure, and similarly, a second element may be named a first element.

In the flowchart described with reference to the drawings in this specification, the order of the operations may be changed, several operations may be merged, certain operations may be divided, and specific operations may not be performed.

FIG. 1 is a schematic diagram illustrating a distributed agreement method of a blockchain network according to an exemplary embodiment.

Referring to FIG. 1, a client and a plurality of nodes (chair node, member node 1, member node 2, and member node 3) may be included in the blockchain network. The blockchain network according to an exemplary embodiment may include a candidate node applying for participation in an agreement for a next block.

A client may be a node that creates a transaction to be stored in a block which is a target of a block agreement. A congress for a distributed agreement of blocks may consist of a plurality of nodes in the blockchain network, and the number of congress nodes in the blockchain network may be 3f+1, where f is an integer greater than or equal to 0, and may be the number of nodes with malicious purposes.

In FIG. 1, the chair node is the node that leads the agreement of the blocks, and may transmit messages and blocks necessary for the agreement to the member node 1, the member node 2, and the member node 3. In addition, the chair node may collect results signed by each member node and propagate the agreed final block into the blockchain network.

The candidate nodes may transmit a participation message to participate in the agreement of the next block (or new block) to the chair node of the current agreement. The chair node may also transmit the participation message to itself to participate in the agreement of the next block. The chair node may also have an equal opportunity to participate in the agreement of the next block by sending the participation message. The chair node may select 3f+1 congress nodes based on the received participation message. For example, the chair node may select the 3f+1 congress nodes in the order of the participation message received.

Figure 2:
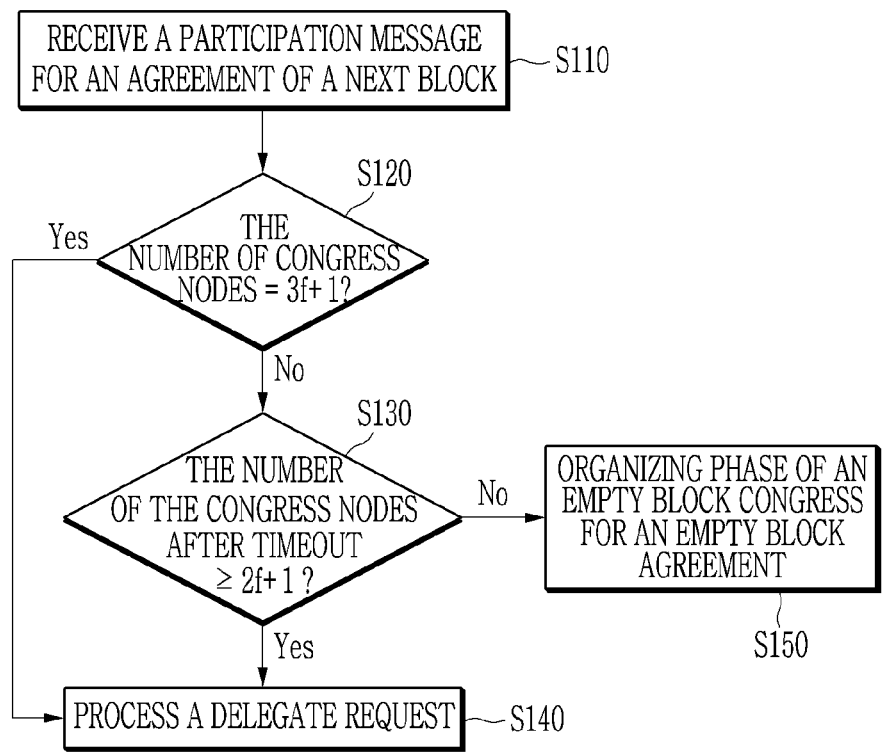
FIG. 2 is a flowchart illustrating a method for handling an exceptional situation which may occur when organizing a next block congress according to an exemplary embodiment.

Due to node failures and/or network delay, the delegate request message transmitted by each member node could not be delivered to the chair node, so that a quorum (for example, 2f+1) for a committee for the current block agreement may not be satisfied and an exceptional situation in which the agreement cannot proceed may occur. In addition, an exceptional situation in which the number of candidate nodes to form the congress for the next block does not reach the number of required congress nodes (e.g., 3f+1) may occur. Referring to FIG. 2, the handling methods for the exceptional situations which may occur in organizing the congress for the next block will be described in detail. Also referring to FIG. 3, the handling method for the exceptional situation (e.g., insufficient quorum) which may occur in organizing the committee will be described in detail.

Referring to FIG. 1, in the request phase, the client may propagate the created transaction to all nodes in the blockchain network. The node receiving the propagated transaction may perform transaction verification and store the verified transaction in a transaction pool. In FIG. 1, the request phase is located before the delegate request phase, but the created transactions can be verified at any time during the block agreement processes and stored in the transaction pool after being verified, so that the created transaction may be propagated at a random moment during any block agreement phase.

Then, when the agreement of the new block begins, a node (member node) included in the congress may transmit a delegate request message including the transaction to be stored in the block to the chair node (Delegate request phase). At this time, the node of the congress may also transmit information necessary for a multi-signature procedure to the chair node. The chair node receiving the delegate request message may organize the committee in the order of the delegate request message received. The committee may include the chair node and may include 2f+1 nodes in total. In FIG. 1, the member node 3 is a congress node, but not a committee node.

Among the nodes included in the blockchain network, a node (candidate node 1 to n) qualified for the congress of the next block through qualification verification may send an agreement participation request message requesting participation in the agreement of the next block to the chair node. The qualification verification may be performed through comparison between a difficulty and a coupon value calculated using the previous block header hash and a nonce to be used for the corresponding block. For example, when the coupon value calculated using the nonce to be used for the corresponding block and the header hash of the previous block is less than the difficulty, the node may be determined to have the qualification for the congress of the next block. The agreement participation request message may include node verification data (e.g., nonce to be used for the block) of the node transmitting the agreement participation request message. The chair node receiving the delegate request message may organize a next block congress in the order of the message received. The node with the smallest coupon value in the next block congress may be elected as a chair node for the next block agreement, and the next block congress may include 3f+1 nodes.

Figure 3:
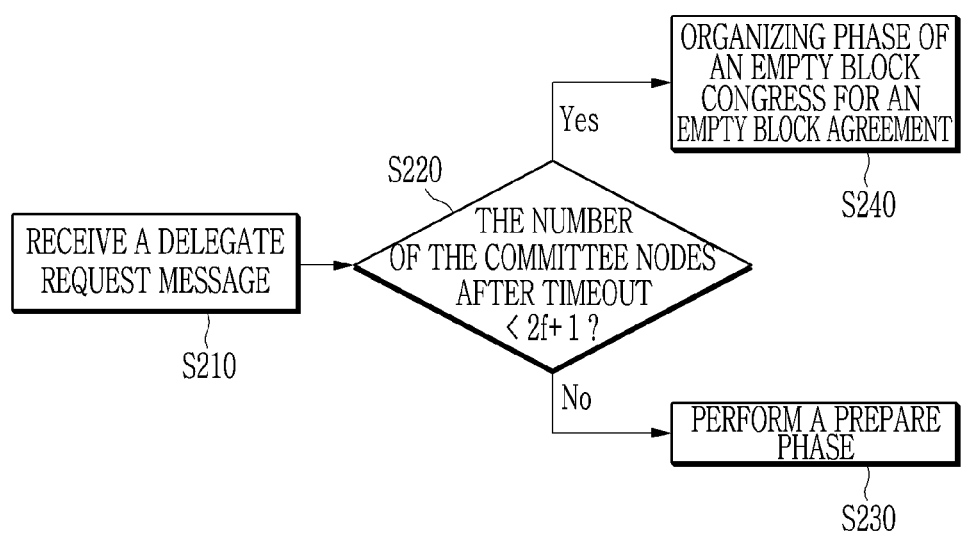
FIG. 3 is a flowchart illustrating a method for handling an exceptional situation which may occur in a delegate request phase according to an exemplary embodiment.

If the node to send the delegate request fails or the delegate request is not normally delivered to the chair node due to network transmission delay (e.g., the case of the member node 3 in FIG. 1), the chair node cannot organize the committee (organizing failure of the committee) and then block agreement cannot proceed at this time. Referring to FIG. 3, the handling method for the exceptional situation which may occur in the delegate request phase will be described in detail.

The chair node may generate a candidate block based on transactions commonly submitted by at least f+1 different nodes among the transactions included in the received delegate request message. The chair node may generate data to verify that the transaction stored in the candidate block is a transaction submitted by at least f+1 different nodes. In addition, the chair node may generate information about 3f+1 nodes among nodes which have transmitted agreement participation request messages for the next block as the next block congress information, and store the next block congress information in the candidate block.

In the prepare phase, the chair node may transmit a preparation message including the generated candidate block, data for verifying the transaction in the candidate block, and information required for the multi-signature procedure to all nodes in the committee. The chair node may send a message to a node included in the congress but not included in the committee notifying that the node is not a committee node, so that the corresponding node does not erroneously determine that a failure has occurred in the chair node because the corresponding node does not receive the preparation message.

Figure 4:
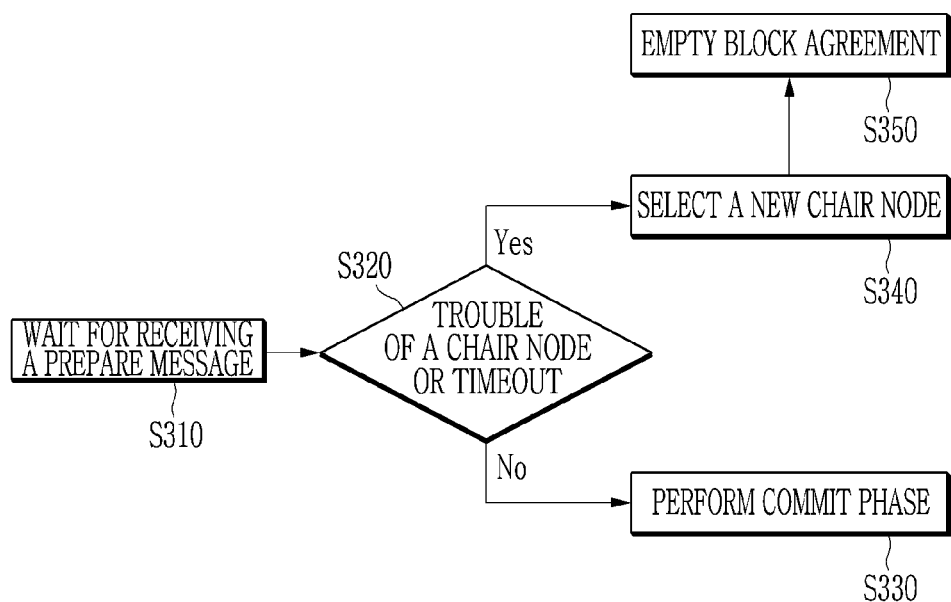
FIG. 4 is a flowchart illustrating a method for handling an exceptional situation which may occur in a prepare phase according to an exemplary embodiment.

In the prepare phase, due to the failure of the chair node or the network delay, all nodes and/or some nodes in the committee may not receive the preparation message within a predetermined time, and then the block agreement does not proceed. Referring to FIG. 4, the handling method for the exceptional situation which may occur in the prepare phase will be described in detail.

Figure 5:
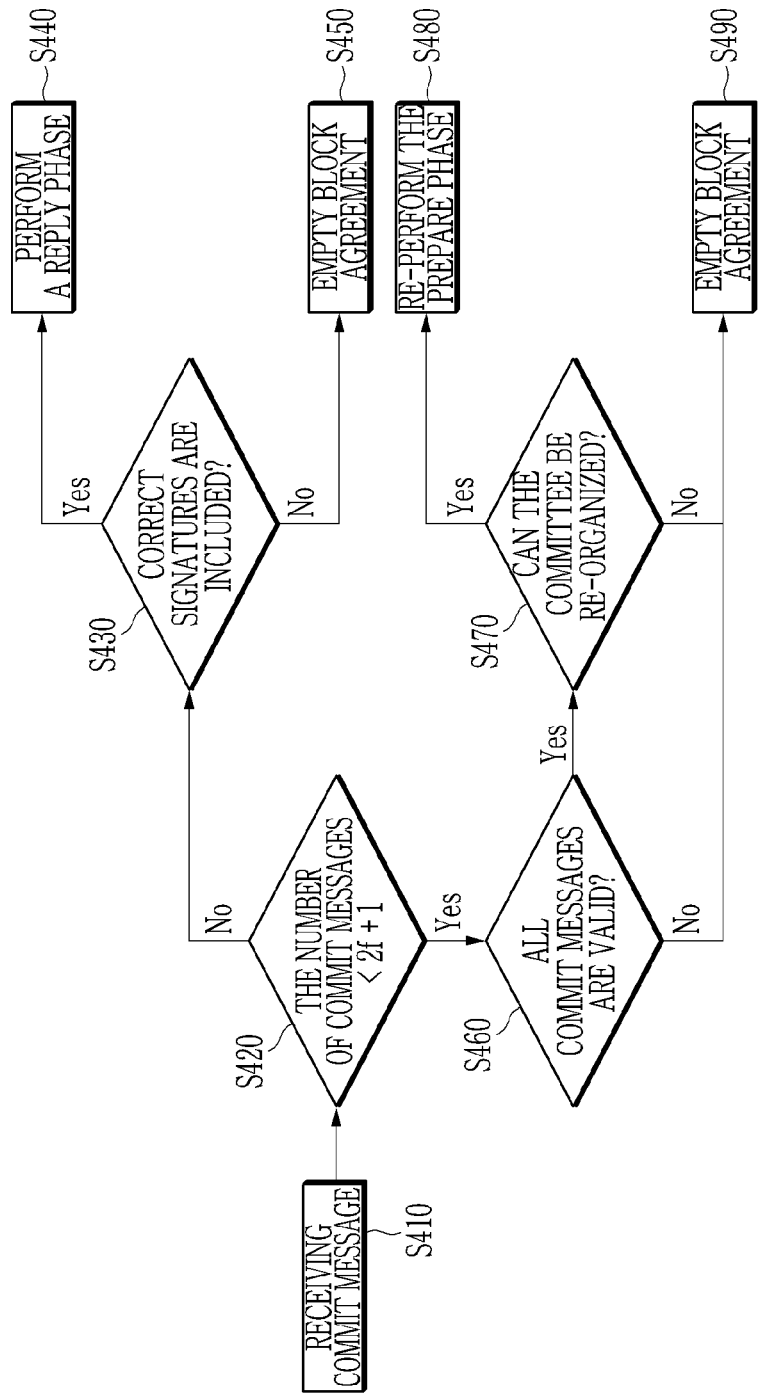
FIG. 5 is a flowchart illustrating a method for handling an exceptional situation which may occur in a commit phase according to an exemplary embodiment.

The committee node, which has received the preparation message within the predetermined time, may verify the candidate block, and when the verification of the candidate block is completed, may transmit a signature to the chair node through a commit message (commit phase). In the commit phase, the chair node may collect the signatures transmitted from the committee nodes and perform the multi-signature procedure on the candidate blocks (e.g., one signature can be created by merging the signatures of each committee node), and the finally agreed Block may be generated. If the failure of the committee node or the delay in the network transmission occurs, the chair node cannot normally receive the commit message, and the chair node may fail to generate the final block. Referring to FIG. 5, the handling method of the exceptional situation which may occur in the commit phase will be described in detail.

Figure 6:
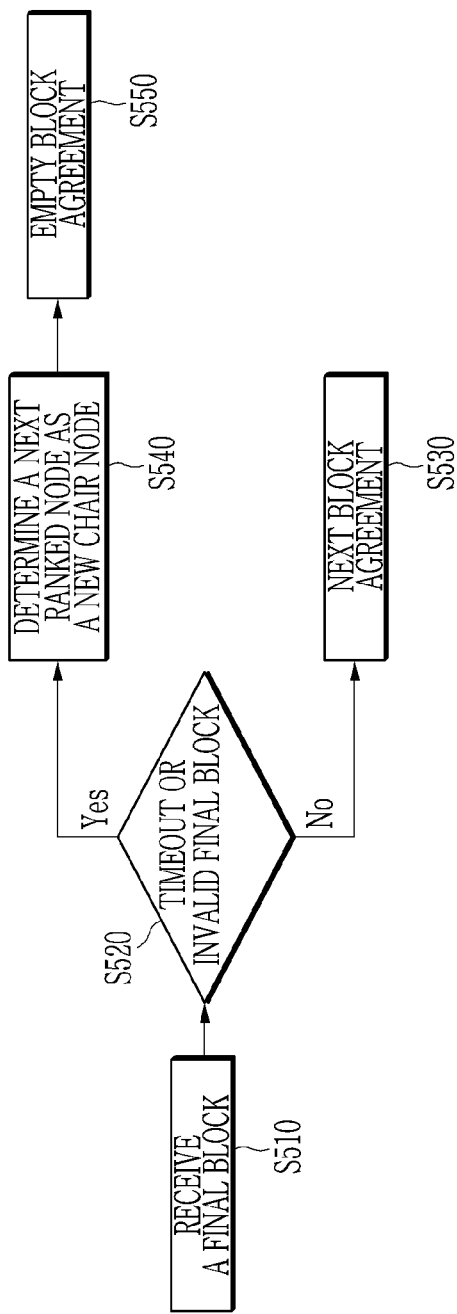
FIG. 6 is a flowchart illustrating a method for handling an exceptional situation which may occur in a reply phase according to an exemplary embodiment.

Finally, in the reply phase, the chair node may propagate the agreed final block to all nodes in the blockchain network. At this time, if the chair node is a Byzantine node and the chair node modifies and propagates the contents of the agreed final block for malicious purposes, the node receiving the final block fails to verify the final block, and an exceptional situation in which the final block cannot be connected to the blockchain may occur. Referring to FIG. 6, the handling method for the exceptional situation which may occur in the reply phase will be described in detail.

FIG. 2 is a flowchart illustrating a method for handling an exceptional situation which may occur when organizing a next block congress according to an exemplary embodiment.

Referring to FIG. 2, after the block whose agreement is completed is connected to the blockchain, the next block congress node may start an agreement for a new block. The nodes included in the blockchain network may check a congress which will proceed with the agreement of the next block and the chair node of the congress based on information about the congress of the next block. The information about the congress of the next block may be included in the candidate block received from the chair node in the agreement process of the previous block.

Each node included in the blockchain network may calculate the coupon value using the nonce value to be used in the next block and the header hash value of the current block to verify qualification for the congress of the next block, and may compare the calculated coupon value with the current difficulty. The difficulty may be greater than 0 and less than or equal to 1, and the difficulty=1 may mean that all nodes have the qualification for the congress of the next block. If the coupon value is less than the difficulty, the node can participate in the congress of the next block. The chair node of the congress of the current block may receive a participation message to participate in the agreement of the next block from each node in the blockchain network (S110). The node may transmit the nonce value used for calculating the coupon value together with the participation message, so that the node which has transmitted the participation message to the chair node may verify the qualification (or eligibility) to participate in the congress for the next block.

The chair node, which has received the participation message for the agreement of the next block transmitted in the delegate request phase, may organize 3f+1 nodes as the next block congress in the order of the participation message received. The chair node may calculate the coupon value of each node using the nonce value of each node, and may elect the node with the smallest coupon value as the chair node of the next block congress. The chair node may store information on the next block congress in the final block agreed after the current block is agreed. The agreed block may be delivered to all blocks in the blockchain network in the reply phase along with the information on the next block congress. The information on the next block congress may include information on the chair node of the next block congress and the congress node of the next block congress. Therefore, the node receiving the agreed block may know the chair node and the congress node of the next block congress based on the information of the next block congress.

When the 3f+1 nodes are organized as the congress, functions of the congress may be performed even if there are failures of f nodes and/or f Byzantine nodes. According to an exemplary embodiment, since the committee which verifies and signs the candidate block to be propagated consists of 2f+1 nodes, when the next block congress including 3f+1 nodes is organized (S120), the chair node may process the delegate request (S140). If the chair node cannot organize the congress having 3f+1 nodes due to insufficient number of messages received during a predetermined period of time, the chair node may proceed with empty block agreement to form the next block congress.

According to an exemplary embodiment, when the number of received participation messages is 2f+1 or more, which is the minimum quorum of the committee nodes required for block agreement, the chair node may organize 2f+1 nodes as the next block congress (S130). In other words, the next block congress including 2f+1 nodes may proceed with the normal block agreement process. When the next block congress consists of 2f+1 nodes, the number of empty blocks which does not carry transactions can be minimized, thereby preventing performance deterioration of the blockchain network. At this time, since the number of nodes in the next block agreement is less than 3f+1, the blockchain network can tolerate failures of fewer than f Byzantine nodes and/or nodes in the agreement processes of the next block.

However, even after the timeout, if the number of the congress nodes is less than 2f+1 (e.g., the number of received participation messages is less than 2f+1 or the number of nodes with a coupon value less than the difficulty is less than 2f+1), the stability of the block agreement cannot be guaranteed, so the blockchain network needs to organize a new congress (an empty block congress) to agree on an empty block (S150). The difficulty may be adjusted to a larger value so that the nodes of the empty block congress may be sufficiently secured. In other words, in order for a larger number of nodes to qualify for the next block congress, the difficulty may be adjusted to the larger value and empty block agreement can proceed.

FIG. 3 is a flowchart illustrating a handling method for an exceptional situation which may occur in a delegate request phase according to an exemplary embodiment.

Referring to FIG. 3, in the delegate request phase, the congress node may transmit transactions to be agreed through the delegate request message to the chair node (S210), and the chairman node may select 2f+1 committee nodes to proceed with block agreement from among all congress nodes including the chair node in the order of the delegate request message received (S220). When the committee consisting of 2f+1 committee nodes is organized, the chair node may perform a prepare phase (S230). At this time, the received delegate request message may be stored for a re-agreement process.

However, if the number of the committee nodes that have transmitted the delegate request message is less than 2f+1 due to the failure of the committee node or transmission delay, the chair node cannot organize the committee, and therefore, the block agreement cannot proceed. In this case, the chair node may separately organize an empty agreement (EA) congress and proceed with an empty block agreement (S240).

FIG. 4 is a flowchart illustrating a method for handling an exceptional situation which may occur in a prepare phase according to an exemplary embodiment.

Referring to FIG. 4, in the prepare phase, the committee node being the congress node and simultaneously included in the committee may wait for reception of the preparation message to be transmitted from the chair node (S310). The preparation message may include data for verifying the candidate block generated by the chair node and transactions included in the candidate block.

A node that is a congress node but is not included in the committee may receive a committee exclusion message from the chair node indicating that it has been excluded from the committee. When all the congress nodes receive the preparation message or the committee exclusion message within the predetermined waiting time (S320), the committee node may perform the commit phase (S330).

However, if the predetermined waiting time expires (i.e., timeout) due to the failure of the chair node or the transmission delay of the network, the congress node may determine that the failure has occurred in the chair node or that connection with the chair node is impossible, select a new chair node (S340), and proceed the empty block agreement with selected new chair node (S350). The committee node that does not receive the preparation message during the predetermined waiting time or the congress node (not the committee node) that does not receive the committee exclusion message during the predetermined waiting time may select another node in the congress as the new chair node. Another node in the congress may be a node that ranks next to the previous chair node (e.g., a node having the next smallest coupon value after the previous chair node).

FIG. 5 is a flowchart illustrating a method for handling an exceptional situation which may occur in a commit phase according to an exemplary embodiment.

Referring to FIG. 5, in the commit phase, when the chair node receives the commit message from each committee node (S410), the chair node may generate the final block through the multi-signature procedure using the signatures included in the commit messages. The chair node may determine whether or not the commit message has been received from all committee nodes within a predetermined time (S420).

If all the commit messages are received within the predetermined time and the correct signature is included in each commit message (S430), the chair node may perform the reply phase (S440). However, when there is a commit message that does not include the signature among all the commit messages, the chair node may perform empty block agreement (S450). This is because the commit message that does not include the signature indicates that there is a committee node that does not agree to the candidate block verification, and thus may be regarded as an agreement failure.

If the chair node does not receive 2f+1 commit message within a predetermined time due to a failure or transmission delay of the committee node, it is considered that an exceptional situation has occurred and an empty block agreement can proceed. At this time, when all the commit messages of less than 2f+1 contain the correct signatures (S460), the chair node may re-organize the committee (S470), re-perform the prepare phase for re-agreement (S480). The reorganization of the committee may be determined by the chair node based on the congress node which has transmitted the delegate request message to the chair node in the delegate request phase before the commit phase. For example, the chair node may decide to reorganize the committee depending on whether there is a node that will replace the node that has not transmitted the commit message among the congress nodes that have transmitted the delegate request message. Re-performing of the prepare phase will be described in detail through FIG. 10. If there is no node to replace the node that has not transmitted the commit message, the chair node may proceed with the empty block agreement (S490).

FIG. 6 is a flowchart illustrating a method for handling an exceptional situation which may occur in a reply phase according to an exemplary embodiment.

Referring to FIG. 6, in the reply phase, the chair node may propagate the agreed final block to all nodes in the blockchain network (S510). If the chair node is a Byzantine node, the chair node can propagate the maliciously modified final block after modifying the contents of the final block, or when the chair node fails, the final block may not be propagated (S520). When the agreed final block is propagated to all nodes in the blockchain network before the timeout and verification of the final block is also completed by each node, the agreement of the next block may proceed (S530).

However, if the congress node verifies that the final block is an invalid block that has been maliciously modified, the congress node may determine the next ranked node in the congress as a new chair node (S540) and proceed with the empty block agreement by the new chair node (S550). Alternatively, if the committee node does not receive the agreed final block within a predetermined time after sending the commit message, the committee node may consider that a failure has occurred in the chair node and proceed with the empty block agreement by determining the next ranked node in the congress as the new chair node. The failure of the chair node may not be detected because nodes other than the committee node in the blockchain network wait indefinitely for the reception of the agreed final block.

Figure 7:
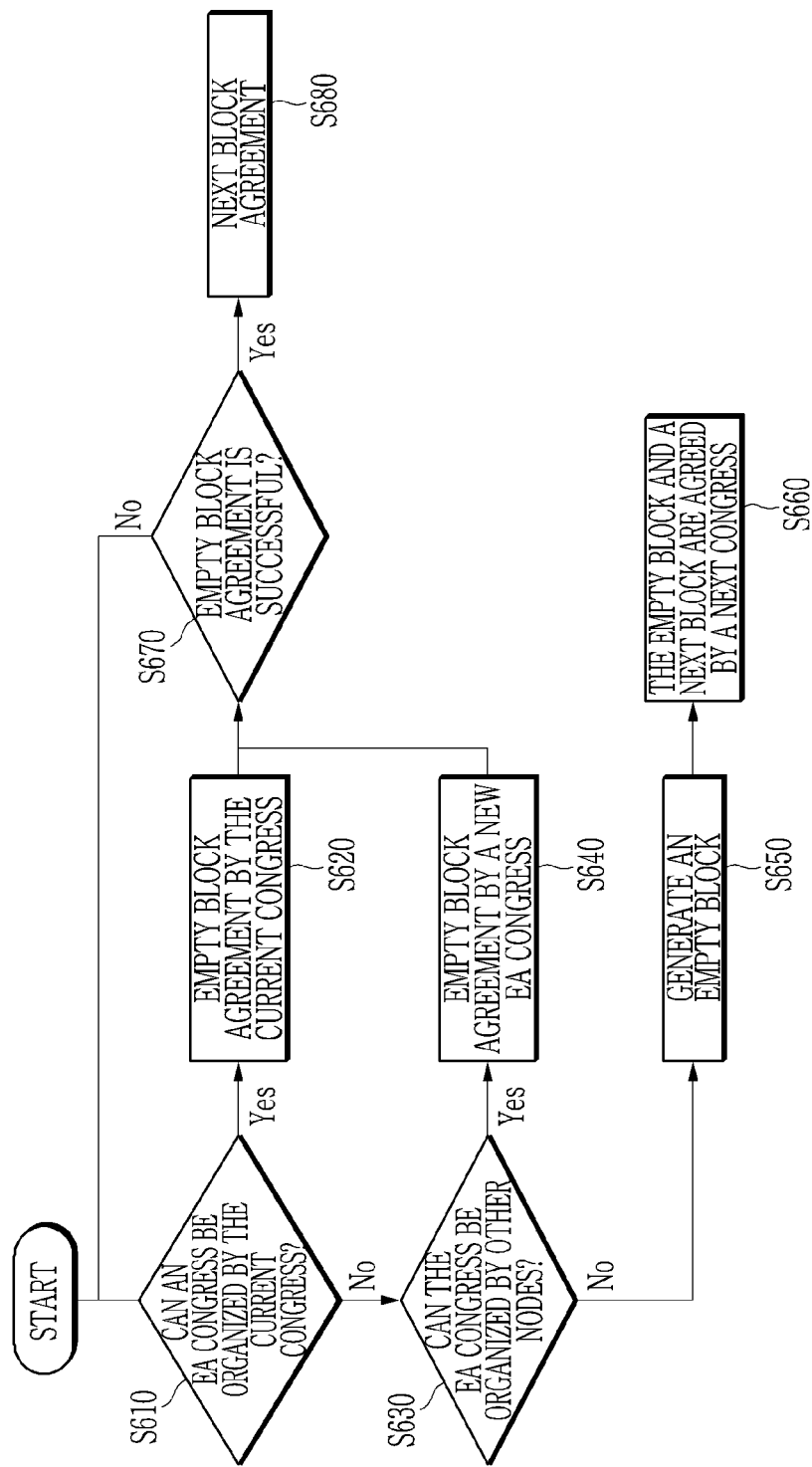
FIG. 7 is a flowchart illustrating a method for determining an empty block congress according to an exemplary embodiment.

FIG. 7 is a flowchart illustrating a method for determining an empty block congress according to an exemplary embodiment.

The chair node or the new chair node (hereinafter, referred to as 'EA chair node') may determine whether an empty block congress (EA congress) for the empty block agreement is organized by the current congress node (S610). If the occurrence of the exceptional situations is recognized by the congress node or the committee node, the EA congress may be determined by the new chair node. As described above, when the exceptional situation occurs in the commit phase, the EA chair node may organize an EA congress based on the committee node that transmitted the commit message and the node that transmitted the message that arrived after the committee had been organized in the delegate request phase. The EA chair node may proceed with the empty block agreement with the EA congress composed of nodes within the current congress when the EA congress can be organized with the current congress (S620).

The EA chair node may determine the EA congress among nodes in the blockchain network when the number of nodes in the current congress is insufficient to organize the EA congress. The EA chair node according to an exemplary embodiment may determine the EA congress by using the congress that participated in the agreement of the previous block. In general, the node that participated in the agreement of the previous block may have the highest probability that it is normally connected to the blockchain network.

Alternatively, the EA chair node may determine a trusted node as an EA congress (S630). The trusted nodes may be determined among nodes that participated in the creation of the genesis block of the blockchain network. The EA chair node may designate the node that participated in the creation of the Genesis block as an initial congress, and may determine the EA congress based on the initial congress. For example, the EA chair node may determine the EA congress based on the level of committee participation of the node that participated in the normal block agreement as the congress node. At this time, the EA chair node may determine 3f+1 nodes among the nodes included in the initial congress as the EA congress in the order of the level of the committee participation.

The level of the committee participation of the node may be determined by the following method. For example, when an agreed block is normally connected to the blockchain, the level of the committee participation of the node participating as the committee node in the block agreement may be increased (e.g., 1 point increase). Alternatively, if the block agreement fails, the level of the committee participation of the nodes included in the committee may be decreased (e.g., decrease by 1 point).

When the EA chair node cannot determine the EA congress, the EA chair node may generate the empty block containing information on the next block congress (S650), and the next block congress may perform the empty block agreement with the agreement of the next block (S660). Afterwards, when the EA chair node succeeds in agreement on the empty block (S670), the next block agreement may be initiated (S680).

Figure 8:
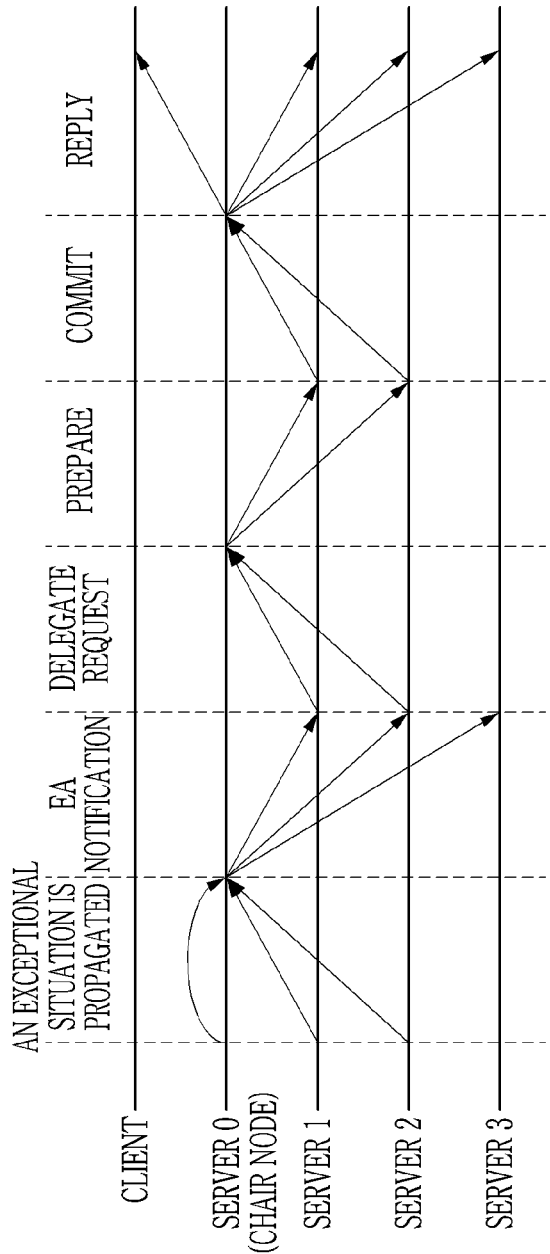
FIG. 8 is a schematic diagram illustrating an agreement method of a block according to an exemplary embodiment.
Figure 9:
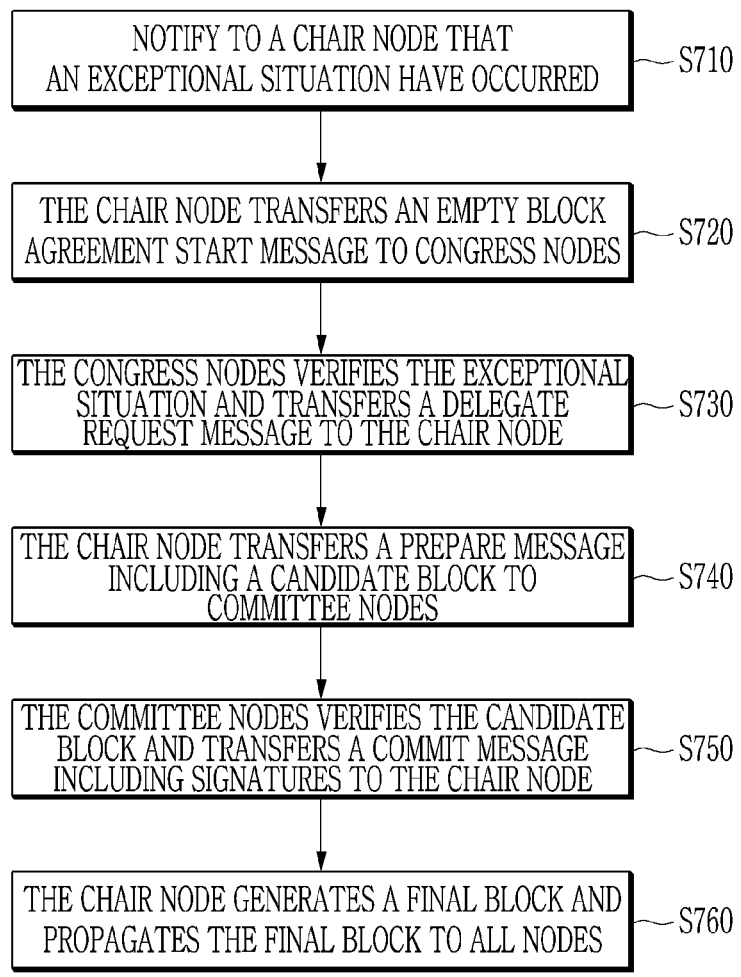
FIG. 9 is a flowchart illustrating an agreement method of a block according to an exemplary embodiment.

FIG. 8 is a schematic diagram illustrating an agreement method of a block according to an exemplary embodiment, and FIG. 9 is a flowchart illustrating an agreement method of a block according to an exemplary embodiment.

Referring to FIG. 9, the node which detects the exceptional situation in each phase of the distributed agreement processes according to FIG. 1, may transmit information on the exceptional situation to the chair node (Exception transferred) (S710). The chair node may be the chair node of the current block congress, or the chair node of the EA congress.

Referring to FIG. 3 and FIG. 5, since the exceptional situations occurring in the delegate request phase and the commit phase may be detected by the chair node, S710 in which the occurrence of the exceptional situation is propagated to the chair node may be omitted.

Referring to FIG. 4, exceptional situations occurring in the preparation phase may be detected by the congress node, and the congress node may determine a new chair node and notify the new chair node of the occurrence of the exceptional situations. Referring to FIG. 6, exceptional situations which occurred in the reply phase may be detected by the congress node or the committee node, and the congress node or the committee node may determine a new chair node and notify the new chair node of the occurrence of the exceptional situations.

The chair node that has received or detected the occurrence of exceptional situations may transmit an empty block agreement start message to the congress node in the current congress (i.e., the current block congress or the EA congress) (EA notified) (S720). The empty block agreement start message may include information on the exceptional situations and data that can be used for verifying the exceptional situations in the form of the transactions.

Thereafter, after receiving the empty block agreement start message, the congress node may verify the exceptional situations using data for verifying the occurrence of the exceptional situations, and then transmit the delegate request message to the chair node (delegate request phase) (S730).

The delegate request message may include verification completed data and data required for the multi-signature procedure.

Thereafter, in the prepare phase, the chair node may determine a committee consisting of 2f+1 nodes including itself in the order of reception of the delegate request message, and generate the candidate empty block that does not include a transaction. The candidate empty block may include information on the exceptional situation and data required for verification of the exceptional situation. In addition, the candidate empty block may further include information on the next block congress determined in the agreement processes in which the exceptional situations occurred. Block agreement in the next block may be normally performed based on the information on the next block congress stored in the candidate empty block in the empty block agreement processes. The chair node may transmit a preparation message including the candidate empty block to the committee node (prepare phase) (S740).

Upon receiving the preparation message, the committee node may verify the candidate empty block, and when the verification is completed, transmit the commit message including the signature of the committee node to the chair node (commit phase) (S750). As in the normal block agreement process, the chair node may perform multi-signature procedure by collecting the signatures included in the commit message, and generate a final empty block to which the agreement has been completed using the multiple signatures. The final empty block does not contain transactions. Then, the chair node may propagate the final empty block to all nodes in the blockchain network (reply phase) (S760).

As explained above, in the event of the agreement failure due to malicious behavior or failure of the chair node and/or the congress node during the decentralized Byzantine-tolerant distributed agreement processes, the continuity of the blockchain can be guaranteed through the generation and agreement of the empty blocks.

Figure 10:
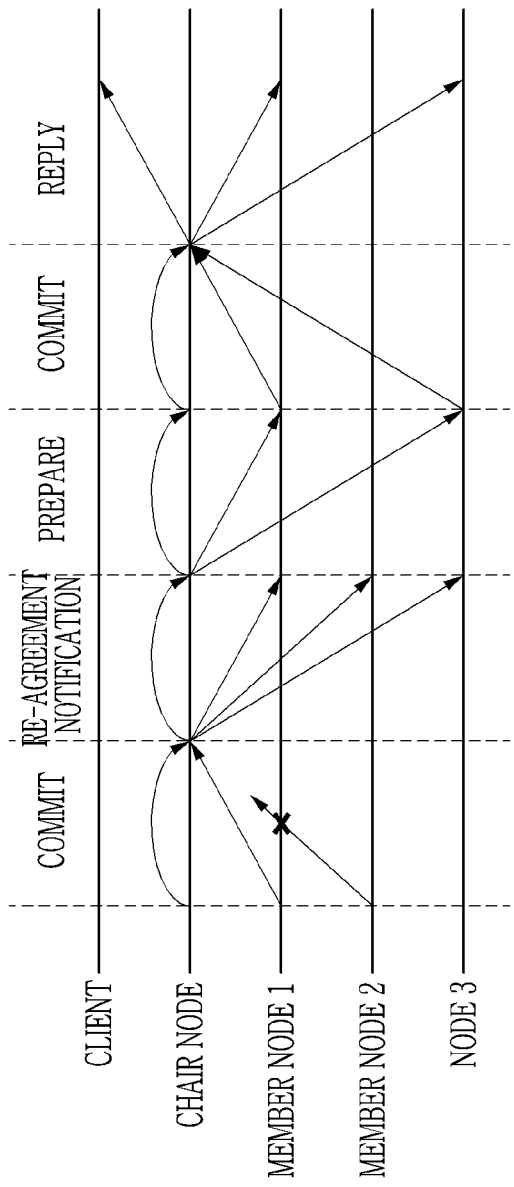
FIG. 10 is a schematic diagram illustrating a re-agreement method of a block according to an exemplary embodiment.

FIG. 10 is a schematic diagram illustrating a re-agreement method of a block according to an exemplary embodiment.

Referring to S420 of FIG. 5, if the chair node does not receive 2f+1 commit message within a predetermined time due to the failure of the committee node or the transmission delay, it is considered that an exceptional situation has occurred. When all received 2f+1 or less commit messages contain correct signatures, the chair node may re-organize the committee by replacing a node that has not transmitted the commit message (e.g., member node 2 of FIG. 10) among the committee nodes with a node that has transmitted the delegate request message (stored at a delegate request process phase). Afterwards, the chair node may re-configure information required for the previously configured multi-signature procedure to proceed with the reorganized committee, and transmit the reconfigured information to all congress nodes (Re-agreement notify). Then, the chair node may proceed with the agreement of the block again by performing the prepare phase again.

Figure 11:
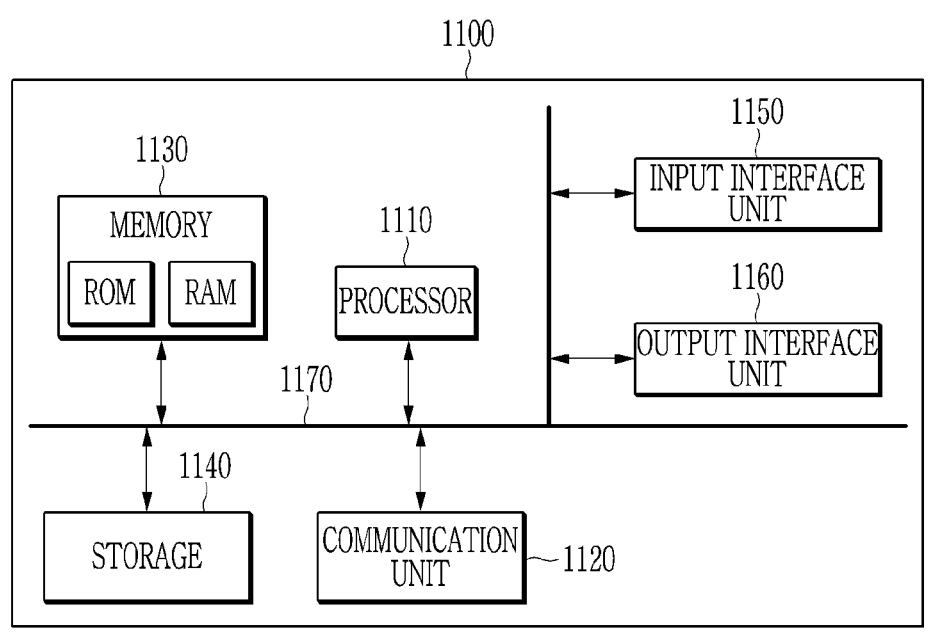
FIG. 11 is a block diagram illustrating a node device in a blockchain network according to another exemplary embodiment.

FIG. 11 is a block diagram illustrating a node device in a blockchain network according to another exemplary embodiment.

The node device according to an exemplary embodiment may be implemented as a computer system, for example, a computer-readable medium. Referring to FIG. 11, the computer system 1100 may include at least one of a processor 1110, a memory 1130, an input interface device 1150, an output interface device 1160, and a storage device 1140 communicating through a bus 1170. The computer system 1100 may also include a communication device 1120 coupled to the network. The processor 1110 may be a central processing unit (CPU) or a semiconductor device that executes instructions stored in the memory 1130 or the storage device 1140. The memory 1130 and the storage device 1140 may include various forms of volatile or non-volatile storage media. For example, the memory may include read only memory (ROM) or random access memory (RAM). In the exemplary embodiment of the present disclosure, the memory may be located inside or outside the processor, and the memory may be coupled to the processor through various means already known. The memory is a volatile or nonvolatile storage medium of various types, for example, the memory may include read-only memory (ROM) or random access memory (RAM).

Accordingly, the exemplary embodiment may be implemented as a method implemented in the computer, or as a non-transitory computer-readable medium in which computer executable instructions are stored. In an exemplary embodiment, when executed by a processor, the computer-readable instruction may perform the method according to at least one aspect of the present disclosure.

The communication device 1120 may transmit or receive a wired signal or a wireless signal.

On the contrary, the embodiments are not implemented only by the apparatuses and/or methods described so far, but may be implemented through a program realizing the function corresponding to the configuration of the embodiment of the present disclosure or a recording medium on which the program is recorded. Such an embodiment can be easily implemented by those skilled in the art from the description of the embodiments described above. Specifically, methods (e.g., network management methods, data transmission methods, transmission schedule generation methods, etc.) according to embodiments of the present disclosure may be implemented in the form of program instructions that may be executed through various computer means, and be recorded in the computer-readable medium. The computer-readable medium may include program instructions, data files, data structures, and the like, alone or in combination. The program instructions to be recorded on the computer-readable medium may be those specially designed or constructed for the embodiments of the present disclosure or may be known and available to those of ordinary skill in the computer software arts. The computer-readable recording medium may include a hardware device configured to store and execute program instructions. For example, the computer-readable recording medium can be any type of storage media such as magnetic media like hard disks, floppy disks, and magnetic tapes, optical media like CD-ROMs, DVDs, magneto-optical media like floptical disks, and ROM, RAM, flash memory, and the like.

Program instructions may include machine language code such as those produced by a compiler, as well as high-level language code that may be executed by a computer via an interpreter, or the like.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software. The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers.

A computer program(s) may be written in any form of a programming language, including compiled or interpreted languages and may be deployed in any form including a stand-alone program or a module, a component, a subroutine, or other units suitable for use in a computing environment.

A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks.

Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium.

A processor and a memory may be supplemented by, or integrated into, a special purpose logic circuit. The processor may run an operating system 08 and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements.

For example, a processor device may include multiple processors or a processor and a controller. In addition, different processing configurations are possible, such as parallel processors. Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment.

Features described in the specification in the context of individual example embodiments may be implemented as a combination in a single example embodiment. In contrast, various features described in the specification in the context of a single example embodiment may be implemented in multiple example embodiments individually or in an appropriate sub-combination.

Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

While this disclosure has been described in connection with what is presently considered to be practical example embodiments, it is to be understood that this disclosure is not limited to the disclosed embodiments.

On the contrary, it is intended to cover various modifications and equivalent arrangements included within the spirit and scope of the appended claims.

What is claimed is:

1. An agreement method of a block in a blockchain network, the agreement method comprising:
   transmitting, by a first chair node, preparation messages to a plurality of congress nodes in a congress in a prepare phase, wherein the congress nodes includes the chair node and 3f (f is the number of Byzantine nodes) nodes;
   transmitting, by the first chair node, final blocks to a plurality of committee nodes in the blockchain network in a reply phase;
   selecting a second chair node among the plurality of congress nodes except the first chair node in an exceptional situation (i) when all the plurality of congress nodes in a congress do not receive the preparation messages within a predetermined waiting time due to a failure of the first chair node or a network delay or (ii) when all the committee nodes which send commit messages in a commit phase do not receive the final blocks within a predetermined time due to a failure of the first chair node or a network delay, wherein the second chair node has a second smallest coupon value after the coupon value of the first chair;
   transmitting, by the second chair node, an empty block agreement start message including information on the exceptional situation and verification data for the exceptional situation to the plurality of congress nodes;
   generating, by the second chair node, a candidate empty block which does not include a transaction when receiving a delegate request message from at least 2f (f is the number of Byzantine nodes) congress nodes among the plurality of congress nodes and transmitting the candidate empty block to committee nodes, wherein the candidate empty block includes information about congress nodes for a congress of next block, and wherein the information about congress node is determined in a process in which the exceptional situation occurred; and
   generating, by the second chair node, a final empty block, which contains no transactions, when the candidate empty block is verified by the committee nodes and transmitting the final empty block to all nodes in the blockchain network.

2. The agreement method of claim 1,
wherein the generating a final empty block when the candidate empty block is verified by the committee nodes and transmitting the final empty block to all nodes in the blockchain network comprises:
   receiving a commit message including signatures of the committee nodes from the committee nodes after the candidate empty block is verified by the committee nodes; and
   performing a multi-signature procedure by collecting the signatures of the committee nodes, and generating the final empty block by using the multiple signature.

3. The agreement method of claim 1, further comprising organizing a new congress for an agreement of an empty block after receiving the information on the exceptional situation,
wherein the new congress is a congress of the agreement processes of the block or a congress including other nodes included in the blockchain network.

4. The agreement method of claim 1, further comprising organizing a new congress for an agreement of an empty block based on nodes which participated in a creation of a genesis block of the blockchain network after receiving the information on the exceptional situation.

* * * * *